United States Patent Office 2,791,500
Patented May 7, 1957

2,791,500

HIGH STRENGTH AIRCRAFT LANDING GEAR STEEL ALLOY ELEMENTS

Francis B. Foley, Philadelphia, Pa., and Charles C. Clark, Little Falls, N. J., assignors to The International Nickel Company, Inc., New York, N. Y., a corporation of Delaware No Drawing. Application March 19, 1954,
Serial No. 417,488

6 Claims. (Cl. 75—124)

The present invention relates to wrought high strength structural elements for aircraft landing gears and the like and, more particularly, to the production of ultra high strength low alloy steels capable of being tempered at temperatures ranging from about 400° F. to about 600° F. without substantial loss in strength properties.

The advent in recent years of large aircraft of greatly increased gross weight has placed a heavy burden on supporting aircraft structures which has necessitated the development of structural materials of high strength and having a high strength to weight ratio, particularly high strength materials for use as structural elements in aircraft landing gears. Generally, in the production of aircraft of low gross weight, it has been the practice to employ light metals, e. g., certain types of aluminum alloys, as structural elements because of their inherent high strength to weight ratios. Thus, for an aluminum alloy having a tensile strength of about 60,000 p. s. i., a steel having a tensile strength of 180,000 p. s. i. was considered necessary in order to compete with the aluminum alloy on a strength to weight ratio basis. While every possible effort was exerted by both the aircraft manufacturers and the material suppliers to extract the last available ounce of strength from the light metal alloys, designs of heavier aircraft have necessitated the development of wrought low alloy steels of improved high strength capable of meeting the rigid strength requirements imposed upon aircraft structures. A wrought steel which has been considered generally satisfactory for use in aircraft structures is a low alloy nickel-chromium-molybdenum steel referred to in the trade as SAE 4340. Another steel which has also been considered satisfactory is a similar steel referred to as SAE 4330. However, with the recent advent of even heavier aircraft, it was found that the peak properties of these steels were not enough to meet new specification requirements for even higher strength, despite the fact that strengths of up to about 250,000 p. s. i. could be attained with the aforementioned type steels. Structural materials were required to have tensile strengths ranging from 260,000 p. s. i. to 280,000 p. s. i. to meet the new demand. Certain modifications of nickel-chromium-molybdenum steels were proposed to meet these requirements, but these steels had certain limitations in that they could not be tempered at temperatures in the neighborhood of about 400° F. because of the low ductility which followed. These steels also could not be tempered at temperatures above 500° F. without substantial loss in strength. While large strides were made by the metallurgist in meeting and satisfying the demands of industry, strength requirements have in the meantime increased to even higher values so that a steel is now desired having strength properties ranging from 280,000 p. s. i. up to 300,000 p. s. i. and higher combined with high yield strength, high toughness as measured by resistance to impact, etc. It was found difficult to produce wrought steels with such high strength properties as generally they were found to be brittle and lacked the required toughness and, thus, could not be used in the production of structural elements for aircraft, particularly structural elements for landing gears subjected to impact during the landing of heavy aircraft. Although many attempts were made to overcome the foregoing difficulties and other disadvantages, none, as far as we are aware, was entirely successful when carried into practice commercially on an industrial scale.

It has now been discovered that a structural element of ultra high strength can be produced by employing a special steel of controlled composition which is capable of being heat treated and tempered to high strengths and toughness as indicated by notched-bar impact test.

It is an object of the present invention to provide a special structural material of ultra high strength suitable for use as structural elements in heavy aircraft.

Another object of the invention is to provide aircraft landing gear elements characterized by high strength to weight ratios and having an all-around combination of high strength properties and toughness.

The invention also contemplates an improved process for the production of a special ultra high strength nickel-chromium-molybdenum steel suitable for use under conditions involving high static and dynamic stresses.

Other objects and advantages of the invention will become apparent from the following description.

Generally speaking, the present invention is based on the discovery that structural elements comprising a special steel composition have an improved and all-around combination of mechanical properties, including high strength combined with toughness and hardness, when the steel contains in combination controlled amounts of nickel, chromium, molybdenum, carbon, silicon, manganese and aluminum.

In general, the special high strength steel provided by the invention contains as critical and essential elements about 1.5% to 3.5% nickel, about 0.7% to 1.5% chromium, about 0.1% to 0.5% molybdenum, about 0.35% to 0.45% carbon, about 1.3% to 2% silicon, about 0.5% to 1% manganese and at least about 0.02% aluminum, the balance of the composition being essentially iron. Generally, the aluminum content ranges up to about 0.08%, the aluminum content preferably not exceeding about 0.1%. In commercially producing structural elements, it is preferred that the special steel contain about 1.8% to 2% nickel, about 0.7% to 0.95% chromium, about 0.3% to 0.5% molybdenum, about 0.38% to 0.43% carbon, about 1.5% to 1.7% silicon, about 0.6% to 0.9% manganese, about 0.02% to 0.08% aluminum and the balance essentially iron. It is also preferred that the steel contain small amounts of vanadium not exceeding about 0.1%. A preferred embodiment of the steel especially suitable for the fabrication of high strength structural elements for aircraft structures, for example, landing gear elements, comprises about 1.9% nickel, about 0.9% chromium, about 0.45% molybdenum, about 0.4% carbon, about 1.6% silicon, about 0.7% manganese, about 0.08% aluminum and about 0.07% vanadium, the balance of the composition being essentially iron. Of course, it will be appreciated that other elements may be present adventitiously in the steel composition in amounts which do not adversely affect the properties of the steel. Thus, the expression "the balance" or "the balance essentially" as applied herein to iron provides for the presence of such other elements. The presence in the steel of other elements may arise from the deliberate additions of such elements or may result from the use of steel scrap in making up a charge, or from the use of master addition alloys, or from the use of deoxidizers, degasifiers, purifiers and the like during processing, etc. These other elements may usually be present adventitiously in amounts not exceeding about 0.2% of the steel composition. Generally, the iron content of the steel ranges from about 90% to about 95%.

Hardened structural elements produced from the wrought structural material contemplated by the invention will generally have a high tensile strength in the neighborhood of about 300,000 p. s. i. in the heat treated and tempered condition, with values generally ranging from about 280,000 p. s. i. to about 315,000 p. s. i. The wrought steel is characterized by good hardenability (as measured by the Jominy-end-quench test) which enables the heat treatment of heavy and thick structural elements or sections. Generally, the special structural steel provided by the invention will attain a Jominy end-quench hardness value of over 52 Rockwell C and even over 55 Rockwell C measured thirty two-sixteenth inches (referred to as $J_{32}$) from the quenched end. The heat treatment employed in obtaining optimum properties comprises normalizing the special steel, then heating the steel to above the critical temperature (i. e., to an austenitizing temperature) followed by quenching or rapidly cooling the steel and then finally tempering the steel in the range of about 400° F. to about 600° F. for about one hour or longer. Generally, the steel is normalized by furnace cooling from a temperature within the range of about 1600° F. to 1750° F. The steel is then oil quenched from an austenitizing temperature falling within the range of about 1500° F. to 1650° F. followed by tempering over the range of about 400° F. to 600° F. The steel produced in accordance with the invention is unique in that it can be tempered at temperatures above 400° F. or above 500° F. and up to about 600° F. without substantial loss in strength properties or hardness. It is preferred that the steel be tempered at the higher temperature range as it has been found that enhancement of the yield strength is obtained with the result that the ratio of yield strength to tensile strength increases without substantially adversely affecting the toughness. Furthermore, by tempering at the higher temperature (e. g., 600° F.), stress relief is more complete than in steels tempered at 400° F.

For the purpose of giving those skilled in the art a better understanding of the invention, the following example is given:

*Example I*

A structural material comprising a forged bar stock was produced from the special steel provided by the invention having a base composition comprising about 1.9% nickel, about 0.9% chromium, about 0.45% molybdenum, about 0.4% carbon, about 1.6% silicon, about 0.7% manganese, about 0.08% aluminum, about 0.07% vanadium and the balance essentially iron (steel No. 1). The bar stock was normalized at 1700° F. and a section of the bar subjected to a Jominy end-quench test. The steel exhibited good hardenability properties as was evidenced by the end-quench test which showed that the steel had a high hardness of about 56.5 Rockwell C at a distance of one-sixteenth of an inch from the quenched end ($J_1$) and also a high hardness of about 54.5 Rockwell C at a distance of forty-sixteenth inches ($J_{40}$) from the quenched end. Another section of the normalized bar which was hardened by quenching in oil from 1600° F. followed by tempering at 600° F. gave the following mechanical properties:

| Property | Steel No. 1 |
|---|---|
| Tensile strength | 294,000 p. s. i. |
| Yield strength (0.2% offset) | 247,500 p. s. i. |
| Ratio of yield strength to tensile strength | 84%. |
| Elongation, in 2 inches | 10%. |
| Reduction of area | 34%. |
| Charpy V at room temperature | 16.5 ft. lbs. |
| Charpy V at minus 50° F | 15 ft. lbs. |
| Rockwell C hardness | 54. |

It will be noted from the foregoing that even after the bar was tempered at 600° F., a high hardness of 54 Rockwell C was obtained combined with a high yield strength of 247,500 p. s. i. and a high tensile strength of 294,000 p. s. i. A markedly high yield strength to tensile strength ratio of about 84% was obtained combined with high toughness as measured by the Charpy V impact test and as indicated by the values obtained for elongation and reduction in area. Generally, the ratio of yield strength to tensile strength obtained after tempering over the range of 400° F. to 600° F. is more than 75% and ranges up to about 90% for the steel provided by the invention.

It is important that the composition of the special steel be controlled over the range specified hereinbefore in order to obtain the improved combination of properties provided by the invention. The importance of controlling the composition of the essential elements is illustrated by the following example:

*Example II*

In determining the importance of controlling the essential elements over the ranges specified, a number of melts were prepared having a base composition similar to the composition of the steel in Example I. The melts were killed with about 0.05% aluminum, in addition to being silicon killed, and then cast into test ingots. The compositions of the melts with variable carbon contents were as follows:

| Steel No. | Percent Ni | Percent Cr | Percent Mo | Percent C | Percent Si | Percent Mn | Percent Al[1] | Percent V | Percent Fe |
|---|---|---|---|---|---|---|---|---|---|
| 2 | 1.90 | 0.93 | 0.47 | 0.38 | 1.59 | 0.65 | 0.05 | 0.07 | Bal. |
| 3 | 1.92 | 0.93 | 0.47 | 0.40 | 1.61 | 0.74 | 0.04 | 0.07 | Bal. |
| 4 | 2.02 | 0.90 | 0.47 | 0.45 | 1.55 | 0.70 | [2] n. d. | 0.08 | Bal. |

[1] As acid soluble aluminum.
[2] Not determined.

The ingots were forged and rolled into bar stock. The bar stock of steel No. 2 was then normalized at 1600° F. while the bar stocks of steel No. 3 and steel No. 4 were normalized at 1700° F. Test specimens were machined from the normalized bar stocks and then austenitized for one hour at 1600° F. while embedded in cast iron chips followed by quenching in oil. The test specimens were then tempered for two hours at temperatures within the range of about 400° F. to 600° F. in a lead-bismuth bath. The following results were obtained for the aforementioned wrought steels:

| Property | Steel No. 2, 0.38% C | Steel No. 3, 0.40% C | Steel No. 4, 0.45% C |
|---|---|---|---|
| Tensile strength p. s. i. | 286,000 | 299,550 | 300,000 |
| Yield strength (0.2% offset) p. s. i. | 224,000 | 241,500 | 252,000 |
| Ratio of yield strength to tensile strength percent | 79 | 83 | 84 |
| Elongation do | 12 | 10 | 9.5 |
| Charpy V impact: | | | |
| At room temperature ft. lbs. | 19 | 16 | 8.5 |
| At minus 50° F ft. lbs. | 17.5 | 15 | 7 |

The results tabulated above confirm that improved combinations of properties are obtained when the carbon content of the special structural steel is controlled over the range of about 0.35% to 0.45%. Tensile strengths in excess of 280,000 p. s. i. and up to about 300,000 p. s. i. were obtained combined with high yield strengths of over about 220,000 p. s. i. and as high as about 252,000 p. s. i. Markedly high yield to tensile strength ratios of the order of 79% and higher were indicated accompanied by good ductility and impact properties. Generally, it was indicated that for carbon contents in the lower part of the specified range, lower tempering temperatures are desirable in order to insure optimum properties. Thus, at carbon contents below 0.4%, it is preferred that the tempering temperature be maintained at or below 500° F., for example, preferably at about 400° F. For carbon contents of about 0.4% and over, it is preferred that the tempering temperature range be from about 500° F. to about 600° F. Thus, steel No. 2, which contained 0.38% carbon, was tempered at 400° F. while steel No. 3 and steel No. 4 which contained 0.40% and 0.45% carbon, respectively, were tempered at about 600° F. It is important that the carbon content should not fall substantially below 0.35%; otherwise the tensile strength falls below 280,000 p. s. i. It is also important that the carbon content not substantially exceed 0.45%; otherwise the toughness of the wrought steel is detrimentally affected. It is preferred that the carbon content be controlled at about 0.4% to insure consistent high toughness and ductility combined with high hardness and high strength. Generally, when the special wrought steel provided by the invention is controlled in carbon contents over the range specified hereinbefore, the finally heated treated and tempered steel will exhibit a room temperature Charpy V impact value of at least about 8 foot pounds.

Similar wrought bar stock was prepared from two steel compositions having, respectively, a silicon content within the invention (steel No. 5) and outside the invention (steel A). The compositions of the silicon-varied melts were as follows:

| Steel No. | Percent Ni | Percent Cr | Percent Mo | Percent C | Percent Si | Percent Mn | Percent Al[1] | Percent V | Percent Fe |
|---|---|---|---|---|---|---|---|---|---|
| 5 | 1.96 | 0.94 | 0.54 | 0.41 | 1.35 | 0.73 | 0.04 | 0.09 | Bal. |
| A | 1.99 | 0.94 | 0.50 | 0.39 | 1.01 | 0.78 | 0.04 | 0.08 | Bal. |

[1] As acid soluble aluminum.

The wrought bar stock of the aforementioned steel compositions was prepared, softened and then heat treated and tempered similarly to alloy No. 3. The effect of silicon on the tensile and yield strengths is given in the following table:

| Property | Steel No. 3, 0.40% C, 1.61% Si | Steel No. 5, 0.41% C, 1.35% Si | Steel A, 0.39% C, 1.01% Si |
|---|---|---|---|
| Tensile strength p. s. i. | 290,500 | 281,000 | 273,000 |
| Yield strength (0.2% Offset) p. s. i. | 241,500 | 233,500 | 231,500 |

All of the aforementioned wrought steels were tempered at 600° F. It will be noted from the table that when the silicon content falls below 1.35%, i. e., falls to 1.01% (steel A), the tensile strength of the steel outside the invention (steel A) falls below 280,000 p. s. i. Even when steel A was tempered at a lower temperature of about 500° F., a tensile strength of only about 278,000 p. s. i. was obtained. It was found that silicon was critically effective in the steel when it was present in an amount of at least about 1.30% and ranged up to about 2%. The silicon content should not exceed 2% in order to avoid the retention of ferrite.

When nickel was omitted from the special steel composition, the strength properties of the wrought steel were generally inferior. This is shown by comparing the substantially nickel-free steel outside the invention (steel B) containing about 1.28% chromium, about 0.40% molybdenum, about 0.38% carbon, about 1.96% silicon, about 1.00% manganese, about 0.05% aluminum, about 0.21% vanadium and the balance essentially iron with steel No. 2 provided by the invention given hereinbefore. A comparison of the mechanical properties of these two wrought steels after hardening followed by tempering at 500° F. is given in the following table:

| Property | Steel No. 2 | Steel B |
|---|---|---|
| Tensile strength p. s. i. | 280,000 | 269,000 |
| Yield strength do | 228,500 | 223,500 |
| Elongation percent | 10 | 8.5 |
| Reduction of area do | 36.5 | 31 |
| Charpy V impact: | | |
| At room temperature ft. lbs. | 18 | 14 |
| Minus 50° F. do | 17 | 10 |

It will be noted from the foregoing table that the tensile strength for steel B (nickel-free steel) is markedly below the tensile strength of 280,000 p. s. i. obtained for steel No. 2 provided by the invention. Likewise, it will also be noted that the ductility and toughness of steel B is lower than that for steel No. 2. Generally, it has been found that when the nickel content of the special steel provided by the invention falls below the minimum of 1.5%, the steel loses its ability to deep harden in large sections. Likewise, when the nickel content of the special steel provided by the invention exceeds 3.5%, there is a strong tendency toward too much retained austenite after quench hardening. It is preferred for optimum results that the nickel content of the steel be controlled over the range of about 1.8% to about 2%.

Steels Nos. 2 to 5 all indicated good hardenability characteristics as determined by the Jominy end-quench test. In order to maintain the good hardenability characteristics of the special steel, it is important that the elements manganese, chromium and molybdenum be controlled over their specified ranges. The manganese content of the special structural steel should not fall substantially below 0.5% or even below 0.6%, particularly where good hardenability is desired in heavy structural elements of large sections hardened by oil quenching. Steel No. 2, which contained about 0.65% manganese, indicated good hardenability (Jominy end-quench test) as evidenced by a high hardness of 54.5 Rockwell C at a distance of forty-sixteenths inches (J40) from the quenched end as compared to a high hardness of 56.5 Rockwell C obtained at a distance of only two-sixteenth inch (J2) from the quenched end. In other words, a fairly uniform hardness would be obtained across a thick cross section of wrought bar stock in the quenched condition when produced from steel No. 2. On the other hand, a steel outside the invention (steel C), which had a low manganese content of only 0.38% in combination with about 1.87% nickel, about 0.91% chromium, about 0.47% molybdenum, about 0.36% carbon, about 1.59% silicon, about 0.05% acid soluble aluminum, about 0.06% vanadium and the balance essentially iron, indicated relatively poor hardenability characteristics when end-quenched from the austenitizing temperature of about 1600° F. This steel exhibited the considerably low hardness of about 43.5 Rockwell C at a distance of about forty-sixteenths inches (J40) from the quenched end of the Jominy test piece, as compared to a much higher hardness of 55 Rockwell C obtained at a distance of about two-sixteenth inch (J2) from the quenched end. Generally, for good hardenability, the chromium and molybdenum contents should be present in the special steel in total amounts greater than 1% and preferably in total amounts of at least about 1.2%. Thus, steel No. 2 which is within the invention and which contained about 0.93% chromium and about 0.47% molybdenum (a total of about 1.4% of chromium plus molybdenum) had a Jominy quenched hardness of 56.5 Rockwell C near the quenched end and a high hardness of 54.5 Rockwell C at a distance of forty-sixteenths inches (J40) from the quenched end. However, another steel containing only about 0.53% chromium and about 0.24% molybdenum (a total of only about 0.77% of chromium plus molybdenum) had a Jominy quenched hardness of 56 Rockwell C near the quenched end and a relatively low hardness of about 51.5 Rockwell C at a distance of about forty-sixteenths inches (J40) from the quenched end. Generally, when the total chromium and molybdenum contents are maintained above 1.2% in combination with the specified amounts of the other essential elements, high strength properties are also assured, particularly tensile strengths of the order of about 280,000 p. s. i. and over.

It has been discovered that when the steel provided by the invention is aluminum killed while molten with amounts of aluminum greater than commonly used for deoxidation purposes and the steel cast into ingots and worked into wrought shapes, e. g., bar stock, improved strength properties combined with high toughness and ductility are indicated in the heat treated and tempered condition, provided the silicon content of the steel is maintained within the ranges specified hereinbefore. In other words, while the special steel would appear to be adequately deoxidized because of its high silicon content, further deoxidation with aluminum (in amounts greater than commonly employed in steel melting) is necessary in order to develop fully the best combination of strength and toughness. Steels containing approximately 0.4% carbon and about 1.6% to 1.7% silicon and containing varying amounts of aluminum ranging from about 0.02% to 0.08% have shown that the aluminum content is important in effecting optimum properties (steels Nos. 3, 6 and 7). The compositions of steels Nos. 6 and 7 employed in making the comparisons are given as follows:

| Steel No. | Percent Ni | Percent Cr | Percent Mo | Percent C | Percent Si | Percent Mn | Percent Al [1] | Percent V | Percent Fe |
|---|---|---|---|---|---|---|---|---|---|
| 6 | 1.98 | 0.94 | 0.50 | 0.40 | 1.72 | 0.76 | 0.02 | 0.10 | Bal. |
| 7 | 2.00 | 0.93 | 0.50 | 0.41 | 1.62 | 0.76 | 0.08 | 0.07 | Bal. |

[1] As acid soluble aluminum.

The wrought steels (Nos. 3, 6 and 7) were normalized at 1700° F., quench hardened from 1600° F. and then tempered at 600° F. The following properties were obtained:

| Property | Steel No. 6, 0.02% Al | Steel No. 3, 0.04% Al | Steel No. 7, 0.08% Al |
|---|---|---|---|
| Tensile strength p. s. i. | 288,000 | 291,500 | 294,000 |
| Yield strength p. s. i. | 242,000 | 241,500 | 247,500 |
| Elongation percent | 10 | 10 | 10 |
| Reduction of area do | 36 | 36.5 | 34 |
| Charpy V notch | | | |
| Room Temperature ft. lbs. | 16 | 16 | 16.5 |
| Minus 50° F. ft. lbs. | 13.5 | 15 | 15 |

The results obtained confirmed that the higher the aluminum content of the steel, the higher are the strength properties, other things being equal.

Most medium carbon low alloy steels in the quench hardened condition cannot be adequately tempered over the range of 400° F. to 600° F. Such steels become embrittled when tempered over the aforementioned range. However, when the special steel provided by the invention has been produced by killing with aluminum and silicon, the aforementioned difficulty is overcome which enables the steel to be tempered over the range of 400° F. to 600° F. without becoming embrittled. It has been discovered that the thus-treated steel provided by the invention improves in one very important respect in that the value for the yield strength increases after tempering rather than decreases as is characteristic of other types of steels. It has been discovered that the silicon content is very important in producing this enhanced effect. The martensite formed by quenching is very hard and likewise very brittle and because of its formation leaves high residual stresses in the steel. Generally, the purpose of tempering is to help relieve these stresses and to improve the ductility which it does at the expense of strength or hardness. It is not desirable in treating ordinary medium carbon low alloy steel (e. g., SAE 4140) to stress relieve such steels over the tempering range of 400° F., to 600° F. as these steels are adversely affected by the aforementioned tempering temperatures which tend to embrittle such steels. It has been discovered that this adverse effect is avoided by the special steel provided by the invention. Thus, the special steel can be stress relieved at tempering temperatures of 400° F., 500° F. and even 600° F. without substantially any noticeable embrittlement. Generally, the special steel exhibits a marked increase in yield strength properties combined with high tensile strength and high hardness and high toughness. This effect of the special steel to exhibit enhancement of yield strength when tempered at higher tempering temperatures is illustrated by steel No. 3 which contained about 1.61% silicon and about 0.04% aluminum. This steel when tempered at 400° F. exhibited a yield strength of about 231,500 p. s. i. This same steel when tempered and stress relieved at 500° F. exhibited a much higher yield strength of about 236,000 p. s. i. and a still higher yield strength of about 241,500 p. s. i. when tempered and stress relieved at 600° F. A similar steel outside the scope of the invention containing a very low silicon content of 0.26% and about 0.03% aluminum was adversely affected when tempered over the range of 400° F. to 600° F. Thus, when this low silicon steel was tempered at 400° F., it exhibited a yield strength of about 217,500 p. s. i. which dropped to 211,500 p. s. i. after tempering at 500° F. and dropped still further to 205,000 p. s. i. after tempering at 600° F. This steel could not be adequately stress relieved without substantial loss in strength properties.

As pointed out hereinbefore, the present invention is particularly applicable to the production of high strength wrought structural materials, such as structural elements for aircraft landing gears and the like. By wrought materials are meant structural materials which have been produced from ingots or other shapes by hot and/or cold working. The present invention is furthermore applicable to the production of high strength machine elements and component parts, such as gears, cams, axles, etc., which in use are subjected to high static and dynamic stresses, wear, etc. The invention is moreover applicable to structural elements comprising large heavy sections as well as elements comprising light sections.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A hardened wrought aircraft landing gear element which in use is subjected to high static and dynamic stresses, said hardened element being comprised of a heat treated steel containing about 1.9% nickel, about 0.9% chromium, about 0.45% molybdenum, about 0.4% carbon, about 1.6% silicon, about 0.7% manganese, about 0.08% aluminum, and about 0.07% vanadium, the balance of said steel being essentially iron.

2. A hardened wrought aircraft landing gear element which in use is subjected to high static and dynamic stresses, said hardened element being comprised of a heat treated steel containing about 1.8% to 2% nickel, about 0.7% to 0.95% chromium, about 0.3% to 0.5% molybdenum, about 0.38% to 0.43% carbon, about 1.5% to 1.7% silicon, about 0.6% to 0.9% manganese, about 0.02% to 0.08% aluminum, and up to about 0.1% vanadium, the balance of said steel being essentially iron.

3. A hardened wrought aircraft landing gear element which in use is subjected to high static and dynamic stresses, said hardened element being comprised of a heat treated steel containing about 1.5% to 3.5% nickel, about 0.7% to 1.5% chromium, about 0.1% to 0.5% molybdenum, about 0.35% to 0.45% carbon, about 1.3% to 2% silicon, about 0.5% to 1% manganese, at least about 0.02% aluminum, and up to about 0.1% vanadium, the balance of said steel being essentially iron.

4. A wrought structural material suitable for the production of hardened structural elements which in use are subjected to high static and dynamic stresses, said wrought material being comprised of a heat treatable steel containing about 1.8% to 2% nickel, about 0.7% to 0.95% chromium, about 0.3% to 0.5% molybdenum, about 0.38% to 0.43% carbon, about 1.5% to 1.7% silicon, about 0.6% to 0.9% manganese, and about 0.02% to 0.08% aluminum, the balance of said steel being essentially iron.

5. A heat treatable steel suitable for the production of hardened structural elements for aircraft structures which in use are subjected to high static and dynamic stresses, said heat treatable steel comprising about 1.5% to 3.5% nickel, about 0.7% to 1.5% chromium, about 0.1% to 0.5% molybdenum, with the sum of the chromium and molybdenum contents greater than 1%, about 0.35% to 0.45% carbon, about 1.3% to 2% silicon, about 0.5% to 1% manganese, at least about 0.02% aluminum, up to about 0.1% vanadium, the balance of said steel being essentially iron.

6. A heat treatable steel suitable for the production of hardened structural elements for aircraft structures which in use are subjected to high static and dynamic stresses, said heat treatable steel comprising about 1.5% to 3.5% nickel, about 0.7% to 1.5% chromium, about 0.1% to 0.5% molybdenum, about 0.35% to 0.45% carbon, about 1.3% to 2% silicon, about 0.5% to 1% manganese, and at least 0.02% aluminum, the balance of said steel being essentially iron.

References Cited in the file of this patent

UNITED STATES PATENTS 2,279,079     Talbot et al. _____ Apr. 7, 1942

FOREIGN PATENTS 457,872     Great Britain _____ Dec. 2, 1936

OTHER REFERENCES

Seabright: The Selection and Hardening of Tool Steels, First Ed., 1950, pages 155, 156.

"Transactions of the American Society for Metals," vol. 45, pages 498–525, especially page 522.

Metal Handbook, 1948 Ed., American Society for Metals, Cleveland, Ohio, page 15.